Oct. 26, 1954  D. P. WRIGHT ET AL  2,692,454
DUSTER
Filed March 27, 1950  2 Sheets-Sheet 2
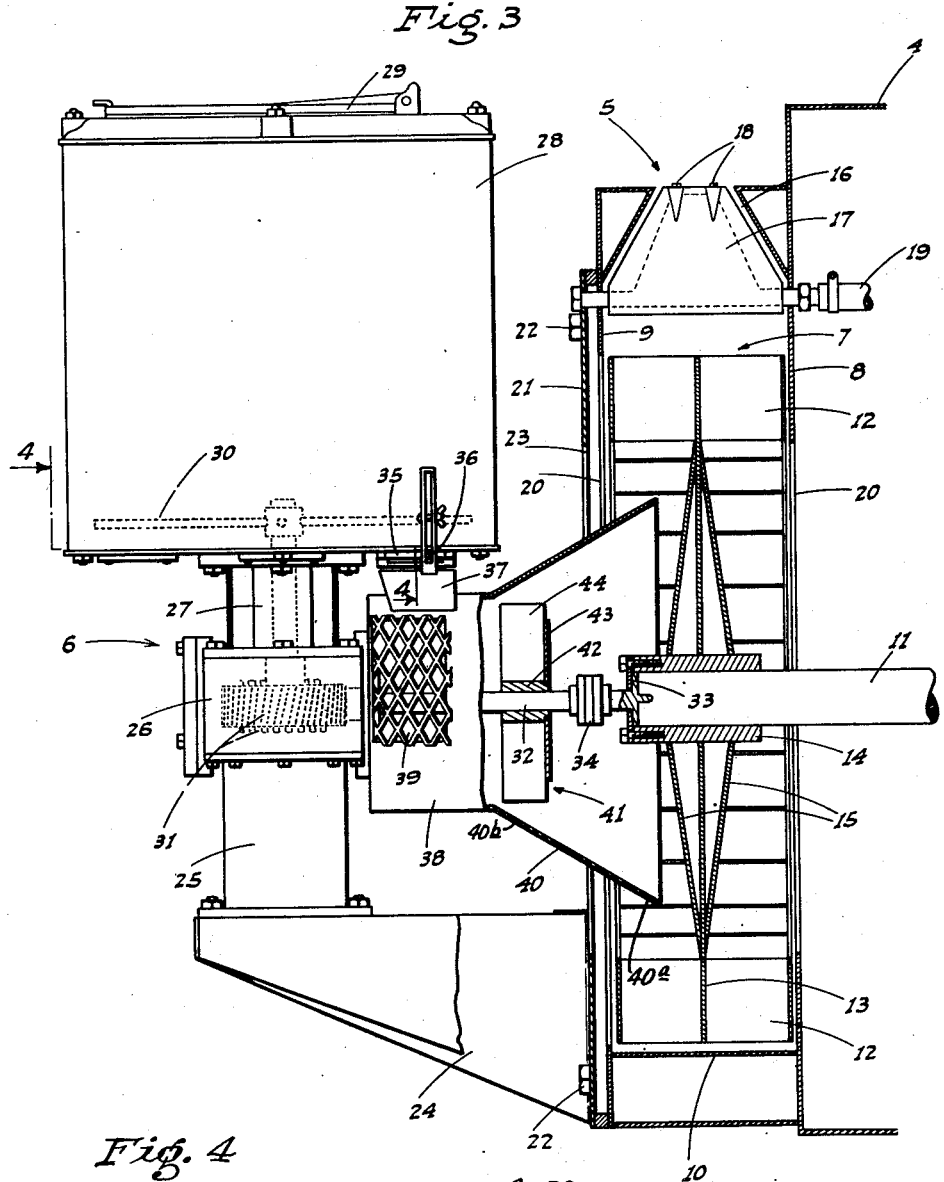
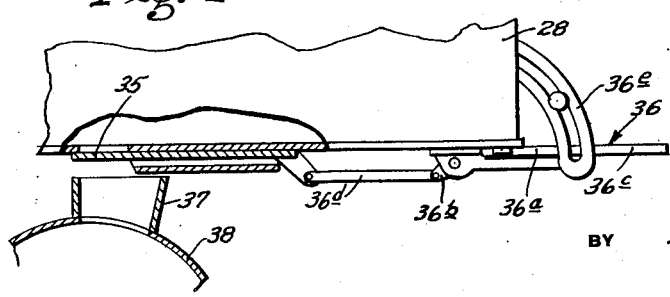
INVENTORS
David P. Wright
Richard H. Fish
BY
ATTORNEYS Patented Oct. 26, 1954

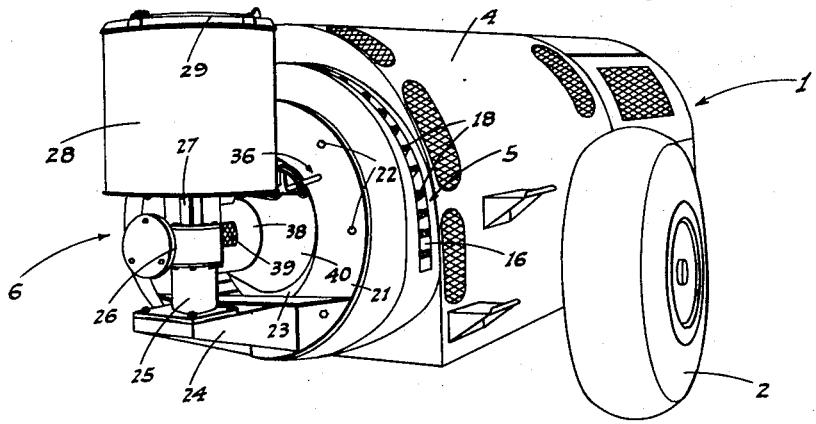
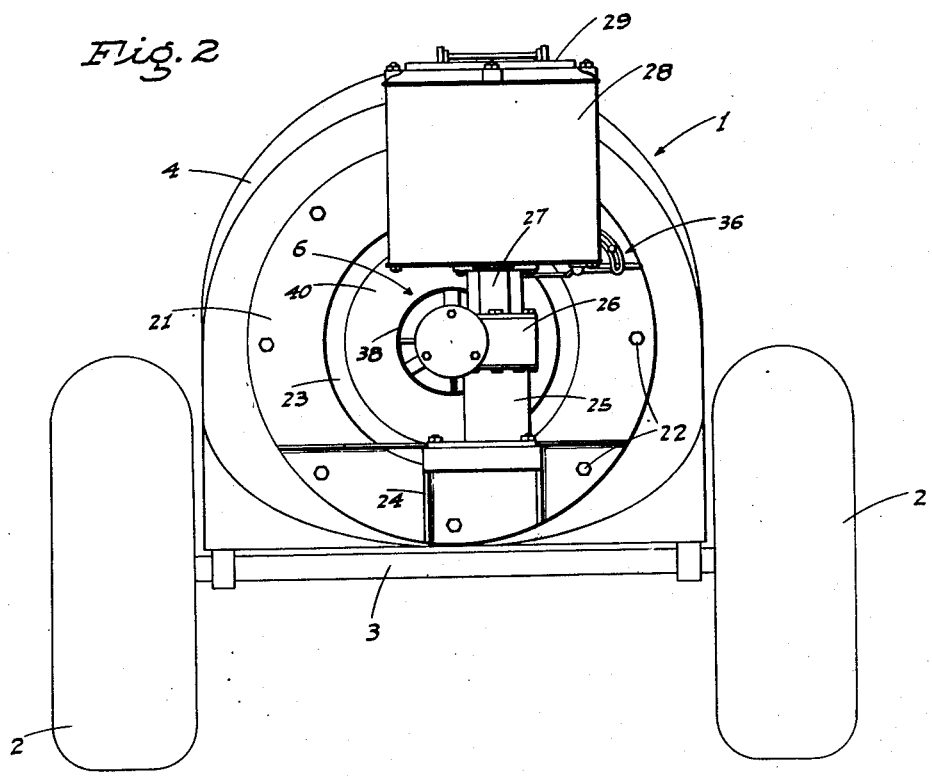

2,692,454

UNITED STATES PATENT OFFICE 2,692,454

DUSTER

David Porter Wright, Oakland, and Richard Harrison Fish, Morgan Hill, Calif., assignors to Air-O Fan Products Corporation, Gilroy, Calif., a corporation of California Application March 27, 1950, Serial No. 152,141

11 Claims. (Cl. 43—148)

This invention relates in general to an agricultural machine adapted for use to apply pest or plant disease control dust by means of an air blast onto orchard trees, or the like.

A primary object of the present invention is to provide a machine which comprises, in novel combination, a centrifugal fan type air blast sprayer, and a dust feeder arranged to deliver into the fan; the machine thus being adapted to separately spray liquid, to separately apply dust, or to simultaneously spray and dust with the dust effectively carried in the moisture laden air blast from the fan.

A further important object of the invention is to produce the aforesaid combination by means of a novel dust feeder arranged to mount, preferably as an attachment, on a centrifugal fan type agricultural spraying machine, such as shown in copending application, Serial No. 41,958, now matured as U. S. Patent No. 2,461,504 issued June 9, 1953.

An additional object of the invention is to provide a dust feeder which is operative to evenly distribute and aerate the dust as fed into the centrifugal fan for air blast discharge therefrom.

Still another object of the invention is to provide a practical and reliable duster, and one which will be exceedingly effective for the purpose for which it is designed.

These objects are accomplished by means of such structure and relative arrangement of parts as will fully appear by a perusal of the following specification and claims.

In the drawings:

Fig. 1 is a perspective view of an agricultural spraying machine including the dust feeder as mounted to deliver to the centrifugal fan which said machine includes.

Fig. 2 is a rear end view of the machine with the dust feeder thereon.

Fig. 3 is an enlarged sectional elevation of the dust feeder as mounted in connection with the air blast spray unit of the machine.

Fig. 4 is a fragmentary enlarged sectional view showing the dust-feed gate and control unit.

Referring now more particularly to the characters of reference on the drawings, the invention is here shown as embodied, preferably as an attachment, in connection with an agricultural spraying machine, indicated generally at 1, which machine is of trailer type and includes transversely spaced wheels 2 carried on an axle 3 within a longitudinal housing 4 which encloses a drive motor, liquid spray reservoir, and other working parts (not shown).

At the rear end of the longitudinal housing 4 the machine includes an air blast spray unit, indicated generally at 5, which is of centrifugal fan type, and rearwardly of said spray unit 5 the latter supports the dust feeder, indicated generally at 6.

The spray unit 5 comprises a relatively large-diameter, centrifugal discharge fan 7 running in a casing which includes a front shroud plate 8, a rear or end shroud plate 9, and a baffle plate 10 which surrounds substantially the lower half of said fan.

The centrifugal fan 7 is supported and driven by a drive shaft 11 which extends rearwardly from within the housing 4, being engine driven.

The centrifugal fan includes, adjacent the periphery thereof, a circumferential row of fan blades 12 supported by a radial parting disc 13 which extends from the fan hub 14; there being frusto-conical stabilizing discs 15 extending on opposite sides of the parting disc 13 from said hub 14 in outwardly converging relation.

The air blast from the centrifugal fan 7 is delivered through an arcuate discharge slot 16 in the fan case, which extends about substantially the upper half portion of said fan, and a row of circumferentially spaced vanes 17 are mounted, in adjustable relation, in the throat adjacent said slot.

The vanes 17 are hollow and have nozzles 18 on their outer edges; spray liquid being fed into said hollow vanes 17 from a valved conduit, shown in part at 19, which leads from the spray reservoir (not shown) in the housing 4.

The shroud plates 8 and 9 have relatively large circular openings 20 for air entry axially into the centrifugal fan 7, and such air is then directed, as a blast, over the vanes 17 and out of the slot 16; the carry being sufficiently great that the spray reaches into trees in rows between which the machine is traveling. The pattern of this spray is regulated by adjustment of the vanes 17.

In connection with the above described spray unit 5 there is provided the following dust feeder:

A vertical attachment ring 21 is detachably secured by bolts 22 to the rear end of the spray unit 5, with the ring opening 23 concentric to the opening 20 in the adjacent rear shroud plate 9.

A heavy-duty bracket 24 projects rearwardly from the bottom of the attachment ring 21, and a pedestal 25 upstands from the rear of said bracket in supporting relation to a gear case 26. In turn, the gear case 26 is fitted with an upstanding neck 27 which supports, in rigid relation, a dust container or hopper 28 including a normally closed filler lid 29. The container or hopper constitutes a reservoir for material to be disseminated in an air stream for crop or other applications.

The dust within the hopper 28 is maintained, under agitation, by a suitable agitator, indicated generally at 30, driven by driving connections 31 which lead downwardly through the neck 27, into the gear case 26; said connections being coupled, within said gear case, to a longitudinal shaft 32 which projects forwardly out of said case. At its forward end the shaft 32 is secured by a flange connection 33 to the rear end of the fan hub 14; there being a universal joint 34 in such shaft to compensate for any slight misalinement.

Dust from the container or hopper 28 feeds through a bottom gate 35 regulated by a control lever 36, which unit may have a remote control extension leading forwardly for access by the tractor operator. As best seen in Fig. 4, lever 36 includes a bell-crank linkage 36a having a short end portion 36b pivoted intermediate its ends on the bottom wall of the hopper 28 and a handle portion 36c extended outwardly for manual access thereto. Lever 36 further includes a linkage 36d pivotally connected at one end to the gate 35 and at the other end to the short end portion 36b. A bracket 36e is attached to the hopper for receiving the handle 36c and for enabling selective, guided movement thereof. In operation, the gate 35 is opened by moving the handle 36c upwardly, as seen in Fig. 4, in the bracket 36e. This pivots the short end portion 36b counterclockwise pulling linkage 36b to the right and thus moving the gate 35 to an open position. As will be quite evident, the reverse operation closes the gate.

From the bottom gate 35 the dust feeds into an immediately adjacent chute 37 which in turn delivers into an intake cylinder 38 disposed coaxially of, and surrounding the shaft 32; such intake cylinder being rigidly supported from the gear case 26.

The intake cylinder 38 is open at the rear, and to afford still further opportunity for air entry one or both sides of said cylinder may have a screened port 39 therein adjacent its rear end.

At its forward end the intake cylinder 38 merges in integral relation with a forwardly projecting, frusto-conical, dust discharge member or discharge bell 40; the latter projecting through the attachment ring 21 and rear shroud plate 9 into the centrifugal fan 7 from the adjacent end thereof, terminating close to the assembly of the parting and stabilizing discs 13 and 15, respectively. The discharge member has an enlarged discharge end 40a and a relatively smaller intake end 40b.

When the centrifugal fan 7 is in operation a powerful air flow suction is created in the intake cylinder 38 and discharge bell 40, whereby dust fed into said cylinder 38 by the chute 37 is picked up and carried through the bell 40 to discharge into the fan. From the fan 7 the air blast carries the dust over the vanes 17 and out of the slot 16, whence said air blast and dust impinges against the trees in the rows between which the machine is traveling.

In order to assure that the dust as fed into the intake cylinder 38 is fully aerated and distributed when discharged from the bell 40 into the fan 7, the following arrangement is provided:

A spinner, indicated generally at 41, is fixed on the shaft 32 within the discharge bell 40, but close to the intake cylinder 38; such spinner including a hub 42, a radial baffle disc 43, and radial blades 44 secured to the hub ahead of said disc.

As the dust moves in the air stream through the intake cylinder 38 and into the discharge bell 40, such dust impinges against the radial baffle disc 43, and thence is thrown radially outwardly by the blades 44 to assure of maximum distribution of the dust as it is discharged from bell 40 into the fan 7.

With the described combination, including the spray unit 5 and dust feeder 6, it will be recognized that the machine is multi-purpose; i. e. it may be used solely for liquid spraying; solely for dust application; or for mixed spraying and dust application; the dust, in the latter event, being carried effectively in the moisture-laden air and thus being adhered to the twigs and foliage of the trees under treatment.

The invention thus provides an extremely practical and reliable machine for multi-purpose treatment of orchard trees or the like.

Under conditions where dusting is not desired, the dust feeder 6 may be detached from the remainder of the machine by the simple expedient of removing the attachment ring 21 and detaching the connection 33.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. An agricultural dusting machine comprising a centrifugal discharge fan, a fan casing including an end shroud having an air intake opening centrally therein, an attachment ring detachably secured to the casing in concentric relation to the opening in the shroud, a bracket projecting outwardly from the ring below the opening, a pedestal on the bracket, a gear case mounted on the pedestal, a dust hopper mounted on the gear case, a shaft detachably connected axially to the fan and extending into the gear case, the hopper including an agitator driven from within the gear case, an intake cylinder surrounding the shaft between the casing and gear case and supported by the latter, means to feed dust into the intake cylinder from the hopper, a discharge bell communicating and rigid with the intake cylinder and projecting axially therefrom through the opening in the shroud, and a dust distribution spinner on the shaft within the discharge bell.

2. An agricultural dusting machine comprising a centrifugal discharge fan, a fan casing including an end shroud having an air intake opening centrally therein, an attachment ring detachably secured to the casing in concentric relation to the opening in the shroud, a bracket projecting outwardly from the ring below the opening, a pedestal on the bracket, a gear case mounted on the pedestal, a dust hopper mounted on the gear case, a shaft detachably connected axially to the fan and extending into the gear case, the hopper including an agitator driven from within the gear case, an intake cylinder surrounding the shaft between the casing and gear case and supported by the latter, means to feed dust into the intake cylinder from the hopper, and a discharge bell communicating and rigid with the intake cylinder and projecting axially therefrom through the opening in the shroud.

3. An agricultural dusting machine comprising a substantially cylindrical fan casing providing a radially disposed air outlet opening and having an end shroud providing an axially disposed air intake opening centrally therein, a rotatably driven shaft mounted in the casing concentrically of the intake opening, a centrifugal discharge fan mounted on the shaft having blades providing portions extended in radial spaced relation to the shaft axially of the shaft toward the intake opening and defining a circular zone between said portions of the blades and the shaft concentrically of the shaft, a frusto-conical bell mounted in the intake opening of the shroud and having a larger end disposed within the casing concentrically of the shaft within the zone defined thereabout by the axially extended portions of the blades and an outer end of reduced diameter extended outwardly from the casing, and means for supplying air borne dust to the outer end of the bell.

4. In an agricultural machine for disseminating intermingled airborne liquid spray and dust, the combination of a substantially cylindrical fan casing having an elongated peripheral outlet slot and an end shroud providing an intake opening therein concentrically of the casing, the casing including peripherally disposed outwardly convergent walls on opposite sides of the outlet slot, a rotatably driven shaft mounted concentrically in the casing, a hub mounted on the shaft, a plurality of radially extended fan blades mounted concentrically on the shaft whereby air is drawn into the casing through the intake opening of the shroud and discharged through the slot incident to shaft rotation to achieve a Venturi effect between the outwardly convergent walls, said blades being extended axially of the shaft toward the intake opening, a plurality of vanes mounted transversely in the slot, nozzles mounted on the vanes and directed outwardly of the casing in substantial alignment with their respective vanes at positions subjected to the Venturi effect in the slot, means for supplying liquid spray material under pressure to the nozzles, a frusto-conical dust discharge bell mounted in the intake opening, having an enlarged inner end concentrically disposed to the shaft and extended into the casing within the zone defined by the axially extended portions of the blades and an opposite end of reduced diameter extended outwardly of the casing, an intake cylinder connected to the outer end of the discharge bell, a hopper mounted above the cylinder, and means for feeding dust from the hopper into the intake cylinder.

5. In an agricultural machine for disseminating airborne liquid spray and dust, the combination of a substantially cylindrical fan casing having an elongated peripheral outlet slot and an end shroud providing an intake opening therein concentrically of the casing, the outlet slot being defined by outwardly convergent walls, a rotatably driven shaft mounted concentrically in the casing, a hub mounted on the shaft, a substantially circular parting disc mounted concentrically on the hub and radially extended therefrom in a plane substantially normal to the shaft, a plurality of substantially flat blades mounted on the disc in concentric spaced relation to the shaft and extended from the disc axially of the shaft toward the intake opening, the blades serving to draw air in the intake opening for discharge through the slot upon shaft rotation, a frusto-conical stabilizing disc mounted concentrically on the hub adjacent to the intake opening and extended therefrom divergently from the hub, said stabilizing disc having a peripheral portion secured to the side of the parting disc disposed toward the intake opening concentrically of the hub, a plurality of vanes mounted transversely in the slot, nozzles mounted on the vanes and directed outwardly of the casing in substantial alignment with their respective vanes and between the outwardly convergent walls of the slot whereby the nozzles are located in an air stream through the slot subjected to a Venturi effect, means for supplying liquid spray material under pressure to the nozzles, a frusto-conical dust discharge member mounted in the intake opening of the shroud, having an enlarged inner end concentrically disposed to the shaft and extended into the casing within the zone defined by the axially extended portions of the blades into adjacent spaced relation to the stabilizing disc and an opposite end of reduced diameter extended outwardly of the casing, an intake cylinder connected to the outer end of the discharge member, a hopper mounted above the cylinder adapted to receive dust to be disseminated, and means for feeding dust from the hopper into the intake cylinder.

6. In an agricultural machine for disseminating intermingled airborne liquid spray and dust, the combination of a substantially cylindrical fan casing having an elongated peripheral outlet slot, said fan casing having outwardly convergent side walls on opposite sides of the peripheral slot and opposite end shrouds providing intake openings concentrically of the casing, a rotatably driven shaft mounted concentrically in the casing, a hub mounted on the shaft, a substantially circular parting disc mounted concentrically on the hub intermediate opposite ends thereof and extended radially of the hub in a plane substantially normal thereto, a pair of frusto-conical stabilizing discs mounted adjacent to opposite ends of the hub and extended divergently from the hub convergently toward the parting disc, said stabilizing discs having peripheral portions concentric to the hub secured to opposite sides of the parting disc, a plurality of substantially flat fan blades mounted on the periphery of the parting disc in planes radial to the shaft and concentrically of the shaft, said blades being extended axially of the shaft oppositely from the parting disc toward the shrouds and defining circular zones inwardly thereof on opposite sides of the parting disc, a plurality of vanes mounted transversely in the slot adjacent to the blades, nozzles mounted on the vanes and directed outwardly of the casing in substantial alignment with their respective vanes, and located between the outwardly convergent side walls of the slot whereby the nozzles are subjected to a Venturi effect when an air blast is projected through the slot, means for supplying liquid spray material under pressure to the nozzles, a frusto-conical dust discharge member mounted in one of the intake openings of the shrouds having an enlarged end concentrically disposed to the shaft extended into the zone defined by the blades at its adjacent side of the parting disc and terminating in adjacent spaced relation to the stabilizing disc disposed theretoward and having an opposite end of reduced diameter extended outwardly of the casing, an intake cylinder connected to the outer end of the discharge member, a hopper mounted above the cylinder, and means for feeding dust from the hopper into the intake cylinder.

7. In an agricultural machine for disseminating airborne dust, the combination of a substantially cylindrical fan casing having an elongated peripheral outlet slot and an end shroud providing an intake opening therein concentrically of the casing, a rotatably driven shaft mounted concentrically in the casing, a hub mounted on the shaft, a plurality of radially extended fan blades mounted concentrically on the shaft whereby air is drawn into the casing through the intake opening of the shroud and discharged through the slot incident to shaft rotation, said blades being extended axially of the shaft toward the intake opening and defining a circular zone inwardly thereof concentrically of the shaft, a frusto-conical dust discharge bell mounted in the intake opening having an enlarged inner end concentrically disposed to the shaft extended into the zone defined by the axially extended portions of the blades and an opposite end of reduced diameter extended outwardly of the casing, an intake cylinder connected to the outer end of the discharge bell, a hopper mounted above the cylinder, and means for feeding dust from the hopper into the intake cylinder.

8. In an agricultural machine for disseminating airborne liquid spray and dust, the combination of a substantially cylindrical fan casing having an elongated peripheral outlet slot and an end shroud providing an intake opening therein concentrically of the casing, a rotatably driven shaft mounted concentrically in the casing, a hub mounted on the shaft, a substantially circular parting disc mounted concentrically on the hub and radially extended therefrom in a plane substantially normal to the shaft, a plurality of substantially flat blades mounted on the disc in concentric spaced relation to the shaft and extended from the disc axially of the shaft toward the intake opening, the blades serving to draw air in the intake opening for discharge through the slot upon shaft rotation, a frusto-conical stabilizing disc mounted concentrically on the hub adjacent to the intake opening and extended therefrom divergently from the hub, said stablizing disc having a peripheral portion secured to the side of the parting disc disposed toward the intake opening concentrically of the hub, a frusto-conical dust discharge member mounted in the intake opening of the shroud having an enlarged inner end concentrically disposed to the shaft in adjacent spaced relation to the stabilizing disc and an opposite end of reduced diameter extended outwardly of the casing, the inner end of the dust discharge member being more closely adjacent to the stabilizing disc than the axially extended ends of the blades, an intake cylinder connected to the outer end of the discharge member, a hopper mounted above the cylinder adapted to receive dust to be disseminated, and means for feeding dust from the hopper into the intake cylinder.

9. In an agricultural machine for disseminating airborne dust, the combination of a substantially cylindrical fan casing having an elongated peripheral outlet slot and opposite end shrouds providing intake openings concentrically of the casing, a rotatably driven shaft mounted concentrically in the casing, a hub mounted on the shaft, a substantially circular parting disc mounted concentrically on the hub intermediate opposite ends thereof and extended radially of the hub in a plane substantially normal thereto, a pair of frusto-conical stabilizing discs mounted adjacent to opposite ends of the hub and extended divergently from the hub convergently toward the parting disc, said stabilizing discs having peripheral portions concentric to the hub secured to opposite sides of the parting disc, a plurality of substantially flat fan blades mounted on the periphery of the parting disc in planes radial to the shaft and concentrically of the shaft, said blades being extended axially of the shaft oppositely from the parting disc toward the shrouds and in their circular arrangement defining circular zones concentric to the shaft on opposite sides of the parting disc, a frusto-conical dust discharge member mounted in one of the intake openings of the shrouds having an enlarged end concentrically disposed to the shaft extended into the zone defined by the blades at its respective side of the parting disc and terminating in adjacent spaced relation to the stabilizing disc disposed theretoward and having an opposite end of reduced diameter extended outwardly of the casing, an intake cylinder connected to the outer end of the discharge member, a hopper mounted above the cylinder, and means for feeding dust from the hopper into the intake cylinder.

10. In an apparatus for disseminating airborne material, the combination of a substantially cylindrical fan casing having an elongated peripheral outlet slot and an end shroud having an intake opening, a rotatably driven shaft mounted substantially concentrically in the casing, a plurality of fan blades mounted on the shaft whereby air is drawn into the casing through the intake opening of the shroud and discharged through the slot incident to shaft rotation, a hollow discharge member mounted in the intake opening having an inner end within the casing radially inwardly of the casing from the outlet slot and an outer end outwardly of the casing, the blades having portions extended longitudinally of the shaft between the inner end of the discharge member and the outlet slot, and means for delivering material to be disseminated to the discharge member.

11. In an apparatus for disseminating intermingled airborne materials having independent sources, the combination of a substantially cylindrical fan casing having an elongated peripheral outlet slot and an end shroud having an intake opening, the fan casing having outwardly convergent side walls on opposite sides of the outlet slot, a rotatably driven shaft mounted substantially concentrically in the casing, a plurality of fan blades mounted on the shaft whereby air is drawn into the casing through the intake opening of the shroud and discharged through the slot incident to shaft rotation creating a Venturi effect between the convergent side walls of the casing, a hollow discharge member mounted in the intake opening having an inner end within the casing radially inwardly of the casing from the outlet slot and an outer end outwardly of the casing, the blades having portions extended longitudinally of the shaft between the inner end of the discharge member and the outlet slot, means for delivering a first material to be disseminated to the discharge member for passage therethrough outwardly through the extended portions of the blades and thence through the discharge slot, and means for spraying a second material to be disseminated between said convergent side walls of the casing for airborne discharge with the first material through the slot.

References Cited in the file of this patent

UNITED STATES PATENTS

| Number | Name | Date |
|---|---|---|
| 671,161 | Day | Apr. 2, 1901 |
| 1,207,316 | Montague | Dec. 5, 1916 |
| 1,530,578 | Sessions | Mar. 24, 1925 |
| 1,551,877 | Henning | Sept. 1, 1925 |
| 1,674,048 | Lang | June 19, 1928 |
| 1,674,391 | Dunnagan | June 19, 1928 |
| 1,750,147 | Wright | Mar. 11, 1930 |
| 1,785,932 | Brown et al. | Dec. 23, 1930 |
| 1,785,945 | Ezdorf | Dec. 23, 1930 |
| 1,858,090 | Hull | May 10, 1932 |
| 1,873,993 | Brasington | Aug. 30, 1932 |
| 2,157,630 | Root | May 9, 1939 |
| 2,200,082 | Daugherty | Nov. 5, 1940 |

FOREIGN PATENTS

| Number | Country | Date |
|---|---|---|
| 529,397 | France | Sept. 9, 1921 |